Oct. 23, 1934.   K. KANAI   1,978,312
MOTORCYCLE FRAME
Filed Sept. 2, 1933
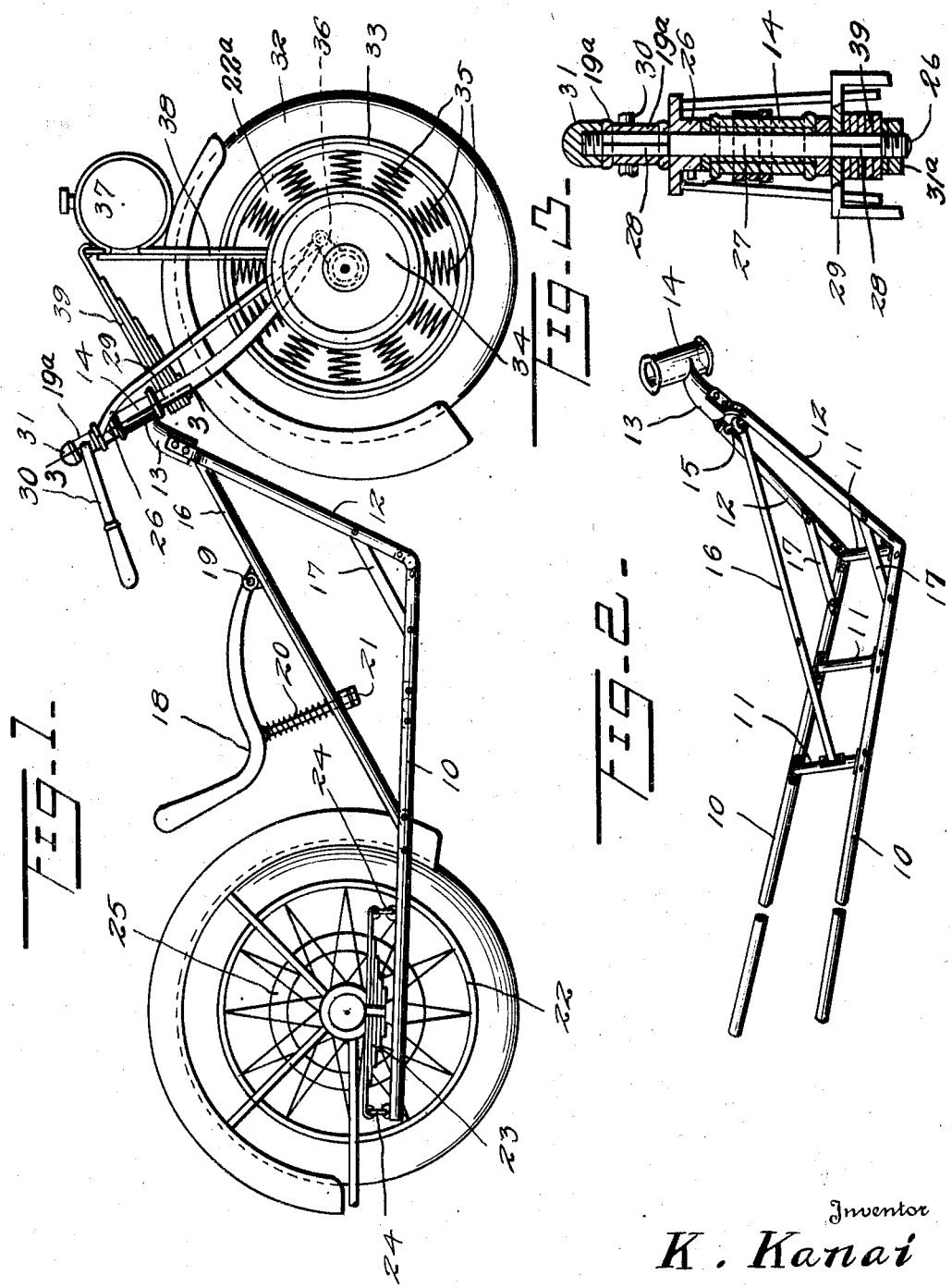
Inventor
K. Kanai
By Watson E. Coleman
Attorney Patented Oct. 23, 1934

1,978,312

UNITED STATES PATENT OFFICE 1,978,312

MOTORCYCLE FRAME

Kunzo Kanai, Bosler, Wyo.

Application September 2, 1933, Serial No. 688,020

4 Claims. (Cl. 208—93)

This invention relates to motorcycles and particularly to motorcycles in which the front wheel is used as a driving wheel.

One of the objects of the present invention is to provide a very simple, strong and rigidly braced frame adapted to be detachably engaged with the steering post of the motorcycle so that the motorcycle can be converted from a bicycle structure to a tricycle and thus fitted for either carrying the driver alone or the driver and passengers or a load.

My invention is illustrated in the accompanying drawing, wherein:—

Figure 1 is a side elevation of a motorcycle having a frame constructed in accordance with my invention;

Figure 2 is a perspective view of the frame;

Figure 3 is a vertical sectional view through the steering post of the front wheel taken on the line 3—3 of Fig. 1.

Referring to the drawing, it will be seen that my motorcycle has a front frame connected to the front wheel, a main supporting frame and a rear wheel or wheels. The main supporting frame where the machine is to be used as a motor operated bicycle, or what is ordinarily termed a bicycle, comprises a pair of longitudinally extending members 10 connected by cross braces 11.

The forward ends of these members are upwardly extended as at 12, one of the braces 11 being located at the angle between the upwardly extending portions and the longitudinally extending portions of the frame. The upper ends of the upwardly extending members 12 are connected to a goose neck 13 which is carried upon a sleeve 14. Just below the goose neck 13, the members are connected by a transversely extending brace 15 and connecting the rearmost brace 11 and this brace 15 is an upwardly and longitudinally extending brace 16. Shorter braces 17 connect the side members 12 with the side members 10 of the frame. The seat 18 which may be of any suitable construction is mounted upon the brace 16 and is shown as pivotally mounted upon this brace at 19, the seat being supported upon a spring 20 through which a bolt 21 passes, this bolt passing through an aperture in the brace 16 which may be enlarged for this purpose at this point.

The rear wheel designated generally 22 may be of any suitable construction and has the usual axle mounted upon roller bearings, these bearings being carried upon springs illustrated as connected leaf springs, supporting the bearing at the middle of the springs, the springs being numbered 23 and the extremities of the springs being shackled at 24 to the corresponding longitudinally extending frame bar 10.

The rear wheel 22 is provided with a brake drum 25 adapted to be operated in any suitable manner, this forming no part of the present invention.

Extending through the sleeve 14 is the steering member comprising an upwardly and rearwardly extending bolt having a medially disposed portion 27 which is cylindrical in form to fit within the sleeve 14. At each end beyond this cylindrical portion, this post is square or many-sided in cross section as at 28 and the extremities of the bolt 27 are screw-threaded. A steering head 19$^a$ fits upon the upper squared portion 28 of the bolt 26 and carries the usual handle bars 30, the head 19$^a$ being held in place by the screw-threaded cap 31. The lower squared end of the bolt 27 is engaged with a square opening in the upper end of the fork 29 and is held in place by a nut 31$^a$. Disposed within the fork 29 is the combined driving and steering wheel 22$^a$. This has the usual rubber tire 32, the rim 33, the hub 34 and preferably a plurality of helically coiled resilient spokes 35 operatively connected to the hub and to the rim so that the rim and the wheel are cushioned with relation to the hub of the wheel and thus all jars to which the wheel is subjected are taken up and cushioned by the spring spokes 35. The arms of the fork 29 are connected in a well-known manner to the front axle through shock absorbers, the wheel being hung on bell cranks 36 rearward of the toes of the fork so that the wheel will glide over irregularities in the road instead of the shock being transmitted directly to the fork. This forms no part of my invention, however, and inasmuch as it is well-known, it will not be described in detail.

A gas tank 37 is supported upon a transmission and motor suspender 38 as disclosed more fully in my prior application which at its lower end is connected to the transmission housing (not shown) and at its upper end is supported by a series of leaf springs 39. The spring at its rear end is operatively connected to the steering member as shown in Figure 3. I have not shown the transmission mechanism nor the driven and control mechanism as this is all disclosed in my prior application before referred to and has no relation to the present invention.

It will be seen that I have provided a motor vehicle frame which is so constructed that either one or two wheels may be used for supporting the rear end of the frame, thus making the device readily convertible from a motor bicycle to a tricycle and further constructed a frame which is particularly strong, durable and which is very simple.

I claim:—

1. A motorcycle including a forked steering post, a fixed axle carried thereby, a front wheel journaled in the fork and on said axle, a body supporting frame having a detachable pivotal connection to the steering post and supported at its rear end on a rear wheel, the forward wheel having resilient spokes and the rear wheel having its axle resiliently engaged with the frame.

2. A motorcycle including a steering post, a fork carried thereby, a fixed axle carried by the fork, a front wheel journaled in the fork and on said axle, a body supporting frame supported at its rear end on a rear wheel, the forward wheel having resilient spokes and the rear wheel having its axle resiliently engaged with the frame, said frame including two parallel, approximately horizontal elements connected by braces and connected at their rear ends to the axle of the rear wheel, the forward ends of said elements extending upward and forward, a neck connecting the upper ends of the upwardly extending elements and having a sleeve through which the steering post passes, a brace connecting the upper ends of the upwardly extending elements to one of the first-named transverse braces, and a seat supported upon the last named upwardly inclined brace.

3. A frame for motorcycles including approximately parallel horizontal elements connected by transverse braces, the forward ends of said elements extending upward and forward, a goose neck connecting the upper ends of the upwardly extending elements and having a sleeve to receive a steering post, a brace connecting the upper ends of the upwardly extending elements to one of the first named transverse braces, diagonal braces disposed at the junction of the horizontal elements with the upwardly and forwardly inclined elements, and a seat supported upon the first named upwardly inclined brace.

4. A motorcycle including a forked steering post, a wheel mounted within the steering post, a body supporting frame having a detachable pivotal connection to the steering post, said frame including two parallel approximately horizontal elements connected by transverse braces, the forward ends of said elements extending upward and forward, a head connecting the upper ends of the upwardly extending elements and having a sleeve through which the steering post passes, a brace connecting the upper ends of the upwardly extending elements to one of the first named transverse braces, a seat supported upon the last named upwardly inclined brace, a rear wheel having an axle, and a spring connection between said axle and the rear ends of the approximately horizontal elements of the frame.

KUNZO KANAI.